(12) United States Patent
Colicino

(10) Patent No.: US 6,908,124 B2
(45) Date of Patent: Jun. 21, 2005

(54) CATCH DEVICE FOR A PIVOTING WINDOW

(75) Inventor: Salvatore Colicino, Turin (IT)

(73) Assignee: Societa Italiana Vetra - SIV S.p.A., San Salvo (IT)

( * ) Notice: Subject to any disclaimer, the term of this patent is extended or adjusted under 35 U.S.C. 154(b) by 0 days.

(21) Appl. No.: 10/198,085

(22) Filed: Jul. 19, 2002

(65) Prior Publication Data

US 2003/0025340 A1 Feb. 6, 2003

(30) Foreign Application Priority Data

Jul. 19, 2001 (EP) .......................................... 01830476

(51) Int. Cl.⁷ .............................................. E05C 17/04
(52) U.S. Cl. ............................... 292/262; 70/89; 49/394
(58) Field of Search ............................... 292/265, 278, 292/DIG. 6, DIG. 5, DIG. 49, 247, 270, 274, 267, 262; 296/218, 224; 70/89, 215, 93, DIG. 12; 49/394

(56) References Cited

U.S. PATENT DOCUMENTS

| | | | | |
|---|---|---|---|---|
| 2,475,131 A | * | 7/1949 | Edwards | 292/263 |
| 3,584,906 A | * | 6/1971 | Budzyn | 292/247 |
| 3,652,112 A | * | 3/1972 | Panelli | 292/210 |
| 3,974,753 A | * | 8/1976 | Blomgren et al. | 296/218 |
| 4,067,605 A | * | 1/1978 | Green et al. | 296/218 |
| 4,078,835 A | * | 3/1978 | Spencer | 292/206 |
| 4,205,875 A | * | 6/1980 | Smith | 296/218 |
| 4,206,939 A | * | 6/1980 | Rowley, II | 292/263 |
| 4,257,632 A | * | 3/1981 | DeStepheno | 292/263 |
| 4,307,906 A | * | 12/1981 | Schenk | 292/247 |
| RE30,969 E | * | 6/1982 | Buck, Jr. | 292/263 |
| 4,435,007 A | * | 3/1984 | Bascou | 292/268 |
| 4,466,644 A | * | 8/1984 | Wooten et al. | 292/263 |
| 4,469,370 A | * | 9/1984 | Petersen | 296/218 |
| 4,484,773 A | * | 11/1984 | Lehne | 292/763 |
| 4,534,587 A | * | 8/1985 | Fleming | 292/263 |
| 4,542,924 A | * | 9/1985 | Brown et al. | 292/87 |
| 4,747,630 A | | 5/1988 | Isomine et al. | |
| 4,923,232 A | * | 5/1990 | Kawagoe et al. | 292/263 |
| 5,346,267 A | * | 9/1994 | Betteridge et al. | 292/263 |
| 5,461,892 A | * | 10/1995 | Hsieh | 70/73 |
| 5,505,065 A | | 4/1996 | Hesse | |
| 6,032,990 A | * | 3/2000 | Stone et al. | 292/263 |

FOREIGN PATENT DOCUMENTS

| | | |
|---|---|---|
| DE | 44 47 185 | 5/1996 |
| DE | 197 47 706 | 5/1999 |
| EP | 0 054 741 | 6/1982 |
| EP | 0 554 839 | 8/1993 |
| FR | 45 637 | 11/1935 |
| JP | 11-192837 | 7/1999 |

OTHER PUBLICATIONS

EPO Search Report dated Jan. 18, 2002.

* cited by examiner

*Primary Examiner*—Gary Estremsky
(74) *Attorney, Agent, or Firm*—Burns, Doane, Swecker & Mathis, L.L.P.

(57) ABSTRACT

The device is suitable for a vehicle window and comprises a first attachment member for fixing to the window, an elongate handle articulated to the first attachment member, a second attachment member for fixing to the vehicle bodywork, and a connecting link connecting the second attachment member to the handle. The length of the link is less than half the length of the handle, and one end of the link is rotatable about an axis in the second attachment member, the other end of the link being rotatable about an axis in the handle which is parallel to the first axis. A locking mechanism acts between the handle and the second attachment member to prevent unauthorised opening of the window. For improved security, the mechanism may pass through an aperture in the handle and into the second attachment member, where it is shielded by sidewalls. The locking mechanism may also lock automatically on closure of the window, and preferably requires rotation of a knob to release the mechanism.

13 Claims, 3 Drawing Sheets

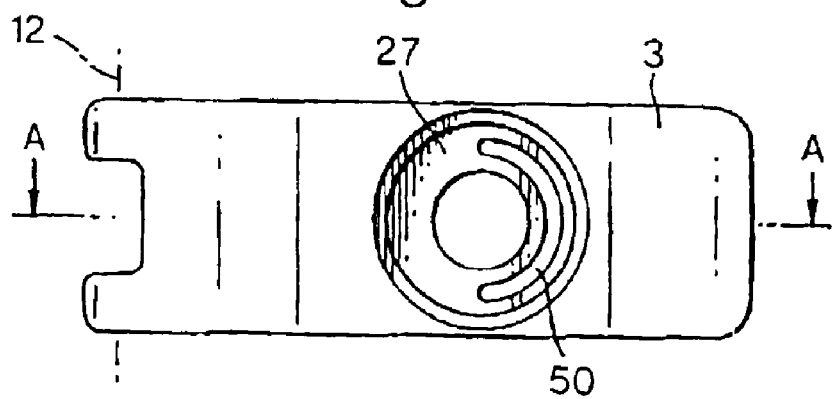
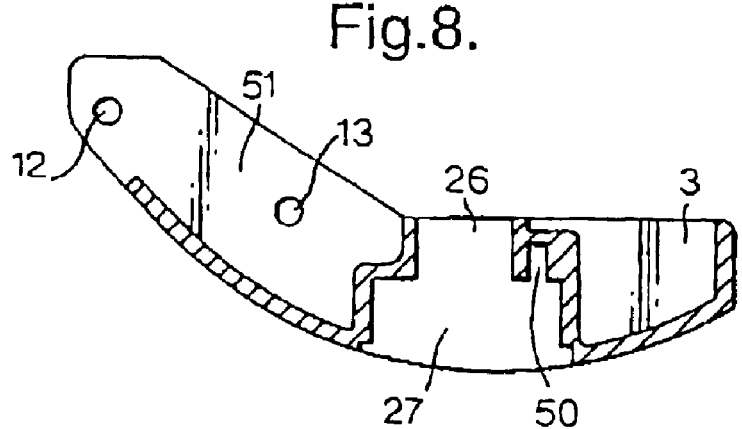
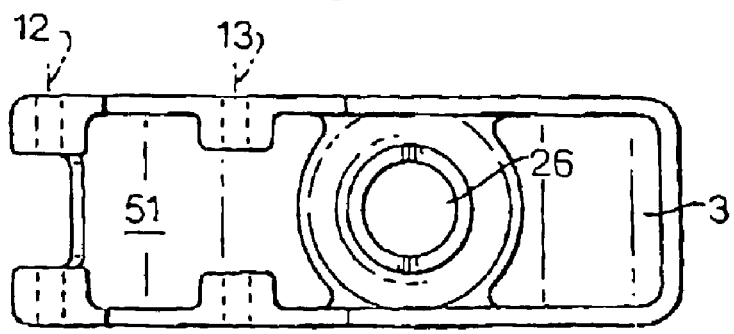

CATCH DEVICE FOR A PIVOTING WINDOW

BACKGROUND OF THE INVENTION

1. Field of the Invention

The present invention relates to a catch device for a pivoting window mounted in the bodywork of a vehicle. More particularly, the invention relates to such a catch offering increased security.

2. Description of the Related Art

It is known to fit pivoting windows to vehicles, especially road vehicles, for instance cars, minibuses and recreational vehicles. Pivoting windows are often fitted as the rear windows of two door cars. Such windows have a generally vertical hinge axis at their leading edge, and a catch is provided at, or in the vicinity of, the trailing edge. The catch serves the dual purposes of holding the window open to a limited extent when ventilation is desired, and fastening the window when in the closed position. Pivoting windows which pivot about a horizontal axis are also known, e.g. in caravans.

Unfortunately, vehicles are possible targets for criminals, and one method of gaining entry to a vehicle is to force a pivoting window, where such is fitted. Consequently, various designs have been proposed for catches offering increased security for such windows.

U.S. Pat. No. 4,206,939 discloses a toggle catch for a vent window which pivots about a horizontal axis. The catch has an anti-theft device comprising a pair of opposed spring biased latches which engage opposed external flanges of the base of the catch. This catch is designed to allow the window to open relatively wide, whereas the more recent tendency is to restrict the degree of opening for reasons of safety, and fuel efficiency.

EP 54 741 A1 is another early example of a catch including a locking mechanism. However, the catch disclosed is complicated and bulky, and protrudes excessively into the interior of the vehicle. A simpler and cheaper design of catch is preferable, and in fact the general type of catch shown as prior art in FIG. 1 of EP 54 741 continues to be widely used for windows which pivot about a generally vertical axis.

Attempts have also been made to provide this simpler design of catch with a locking mechanism, and reference may be made to JP 11-192837 (Kokai, or OPI number), or DE 197 47 706 A1. For instance, the latter publication discloses a window extender with a locking element which arrests part of the catch mechanism. In one embodiment the locking element engages a guide lever directly, whereas in a second embodiment it is a pivot axis of the lever which is engaged. Similarly, in JP 11-192837 a pivot axis of a catch is arrested.

In practice it is found that such arrangements possess a degree of elasticity, which, together with the cumulative effect of free play in the joints (especially after a number of years' service), results in the window being held less tightly closed than is desirable. In particular, a small amount of slack or free play in the locked catch maybe enough to permit the window to be prised open from the outside a sufficient distance to allow a wire or other slender tool to be inserted by a would-be car thief.

Concurrently, vehicle manufactures are under pressure in many countries from governments and consumer groups alike to provide vehicles with enhanced security. In particular, a standard is in use which requires a vehicle to resist break-in for two minutes.

SUMMARY OF THE INVENTION

It would therefore be desirable to provide a catch device for a pivoting window which alleviates the disadvantages of known catches, and assists vehicle manufacturers in attaining the desired standard of security.

According to the present invention there is provided a catch device for a pivoting window intended to be mounted in the bodywork of a vehicle, the device comprising:

a first attachment member, for fixing to the window, an elongate handle, one end of which is articulated to the first attachment member, a second attachment member, for fixing to the vehicle bodywork, a connecting link connecting the second attachment member to the handle, the length of the link being less than half the length of the handle; one end of the link being rotatable about an axis in the second attachment member, and the other end of the link being rotatable about an axis in the handle, the axes of rotation for the two ends of the link being parallel, and a locking mechanism to prevent unauthorised opening of the window, characterised in that the locking mechanism acts between the handle and the second attachment member.

The locking mechanism acts between the handle and the second attachment member in the sense that components of the locking mechanism are incorporated in each of the handle and the second attachment member respectively, and these components co-operate to prevent relative movement between the handle and the second attachment member, in effect, directly locking one to the other.

When locking a pivoting window, the desired objective is of course to prevent movement of the window relative to the vehicle bodywork. The present invention seeks to approach this condition as closely as is practicable by locking the handle to the second attachment member, which is rigidly fixed to the vehicle bodywork. Unlike prior art locking mechanisms which merely lock an intermediate component such as a connecting link, the locking mechanism of the present invention by-passes several joints, eliminating the effect of any free play therein. The effect of elasticity of intervening components is also alleviated, and a more secure locking mechanism is thereby provided.

Preferably, therefore, the locking mechanism passes through an aperture in the handle and into the second attachment member. This allows the mechanism to be shielded by the handle and the second attachment member, so that it is less susceptible to interference from a potential thief.

Advantageously, the locking mechanism locks automatically on closure of the window, i.e. it is a latching mechanism. This precludes the possibility of the window inadvertently being left unlocked.

Normally, the locking mechanism is unlocked by manual operation of a button or knob. The latter may be mounted on, or contained within, the handle or the second attachment member.

To increase security further, unlocking of the locking mechanism preferably involves rotation of a button or knob. It is considered especially difficult for a vehicle thief to achieve a rotational movement when unlawfully seeking to unlock a locking mechanism from outside a vehicle. Of course, matters may be made even more difficult for the thief by combining the rotational movement of the button or knob with a lifting or pressing movement.

BRIEF DESCRIPTION OF THE DRAWINGS

The invention will now be further described by way of the following specific embodiments, which are given by way of illustration and not of limitation, and with reference to the accompanying drawings in which:

FIG. 3 shows a locking mechanism for the catch, including, as a separate view, an end view of a shaft extending from the knob of FIG. 2, showing detail of a circlip;

FIG. 5 shows some internal aspects of the body by dashed lines, including the position of a slider forming part of the locking mechanism, together with a removed view of the slider for clarity;

FIG. 7 is a front elevation of the catch handle, similar to FIG. 2, but with the knob removed;

FIG. 8 is a horizontal section on the line A—A in FIG. 7; and

FIG. 9 is a projected view of the rear of the catch handle, i.e. equivalent to a mirror image of a rear view of the handle as shown in FIG. 7.

DETAILED DESCRIPTION OF THE PREFERRED EMBODIMENTS

Figure 1:
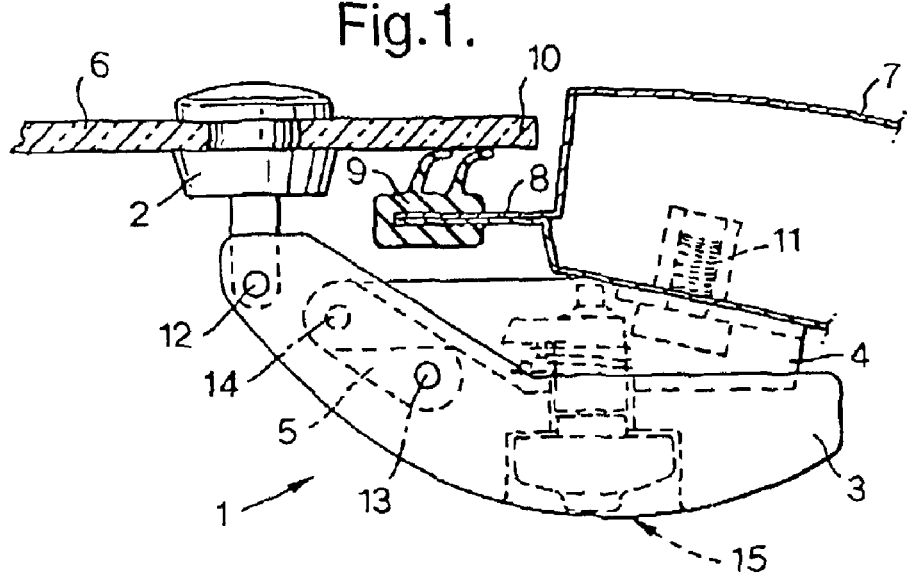
FIG. 1 is a plan view of a catch according to the invention, including phantom views of some of the hidden components, and also showing in section part of a window together with a fragment of vehicle bodywork.

Referring to FIG. 1, a catch 1 according to the invention is shown, comprising a first attachment member 2, an elongate handle 3, a second attachment member 4, and a connecting link 5. Part of a window 6 is also shown, together with a fragment of vehicle bodywork 7, including a flange 8 provided with a seal or weather-strip 9. The window 6 is a pivoting window, and its leading edge (not shown) pivots about a generally vertical hinge axis (not shown) positioned to the left of the drawing, whereas its trailing edge may be seen in the drawing and is denoted by reference numeral 10. The first attachment member 2 is fixed to the window in the vicinity of its trailing edge; fixing of the member may be achieved by a bolt passing through an aperture in the window (as shown), or by the use of adhesive. The second attachment member 4 is fixed to the vehicle bodywork 7 by a bolt 11; this second attachment member may also be referred to as the catch body.

The elongate handle 3 is articulated to the first attachment member 2, e.g. by means of pivot axis 12; the handle is also connected to the connecting link 5 by a further pivot axis 13, and the link is in turn connected to the catch body 4 by a yet further pivot axis 14. In each case, the pivot axis may take the form of a pin passing through bores in the respective components, or any convenient alternative form. At least axes 13 and 14 are parallel, and normally all three axes are parallel. The connecting link 5 is housed in a hollow space within the handle 3, and the length of the link is less than half the length of the handle. This size relationship between these two components provides space for the locking mechanism to pass through the handle; furthermore, the length of the link together with the angle through which it rotates determine the amount by which the window maybe opened. Preferably the link rotates through at least 160°, more preferably at least 180°, when the window is opened or closed. A locking mechanism, generally designated 15, is indicated by dashed lines in FIG. 1, and is more fully described in connection with FIG. 3 below.

Figure 2:
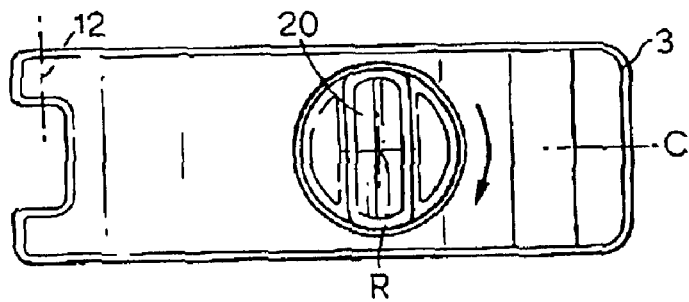
FIG. 2 is a front elevation of the handle of the catch, showing a knob by which the catch may be unlocked.

FIG. 2 shows the handle 3 from the front, and a circular rotatable knob 20 is clearly visible, located in a recess in the handle; the centre of the knob is designated by the letter R. The handle is symmetrical and has a centre-line C which extends in the direction of elongation of the handle.

Figure 3:
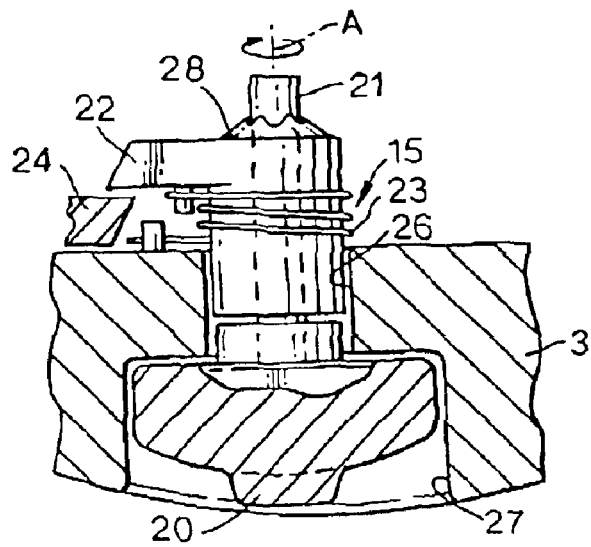
FIG. 3 is a fragmentary view, partially in section, of part of the handle of FIGS. 1 and 2, viewed in the same direction as FIG. 1.
Figure 4:
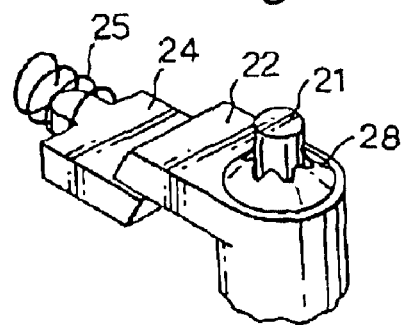
FIG. 4 is a fragmentary perspective view of part of the locking mechanism of FIG. 3.

FIG. 3 shows the locking mechanism 15 in more detail, and depicts it in the locked condition. It comprises the knob 20, shaft 21, detent 22, return spring 23, slider 24 and further return spring 25 (FIG. 4). Knob 20 is located in recess 27, and is rotatable about an axis A, which passes through the centre of the knob R The knob is mounted (or otherwise provided) on the end of the shaft 21 which extends along the axis A. An aperture 26 in the form of a bore extends through the handle from the recess 27, allowing the shaft to pass through the handle into the catch body 4. Preferably the aperture is located centrally in the handle, e.g. the aperture is traversed by the centre-line of the handle. A detent 22 is provided at or near the end of the shaft, and takes the form of a projection extending at right angles to the axis of the shaft. From a manufacturing point of view, it is convenient to provide the detent on a sleeve, which is slid onto the shaft, and retained in position by circlip 28. In use, the knob is rotated in a clockwise direction, as viewed in FIG. 2, and a returning force is provided by spring 23, coiled around the shaft, which urges the knob to rotate in an anticlockwise direction. A slider 24 (see also FIGS. 4, 5 and 6) comprising a small flat plate slidably mounted in the catch body is urged towards the shaft by virtue of return spring 25, which bears against part of the catch body.

FIG. 4 is a perspective view of part of the locking mechanism, showing the relationship of the detent and slider. In the locked condition, the detent overlaps the slider, thereby engaging it, and prevents the handle from moving, so that the window cannot be opened. To unlock the catch, the knob is rotated one quarter turn against the force of the spring, thereby moving the detent out of its overlapping relationship with the slider, so that the handle is free to move. As soon as the knob is released, it is returned to its original position by the spring 23. The ends of the detent and slider are angled to serve as cam surfaces 30, 31 respectively, the effect being that as the catch is closed (whether as a consequence of the window or the handle being pushed shut), cam surface 30 on the detent bears against cam surface 31 on the slider, producing a resultant force which drives the slider back against the force of spring 25 to an extent sufficient to allow the detent to pass the slider. The slider then jumps back to its original position, locking the catch. The mechanism will thereby lock automatically on closure of the window.

Figure 5:
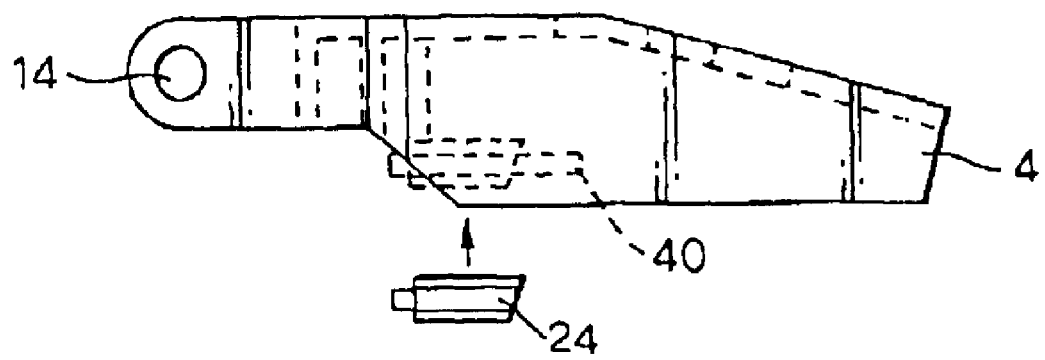
FIG. 5 is a plan view of the catch body, being an attachment member for fixing to the vehicle bodywork.
Figure 6:
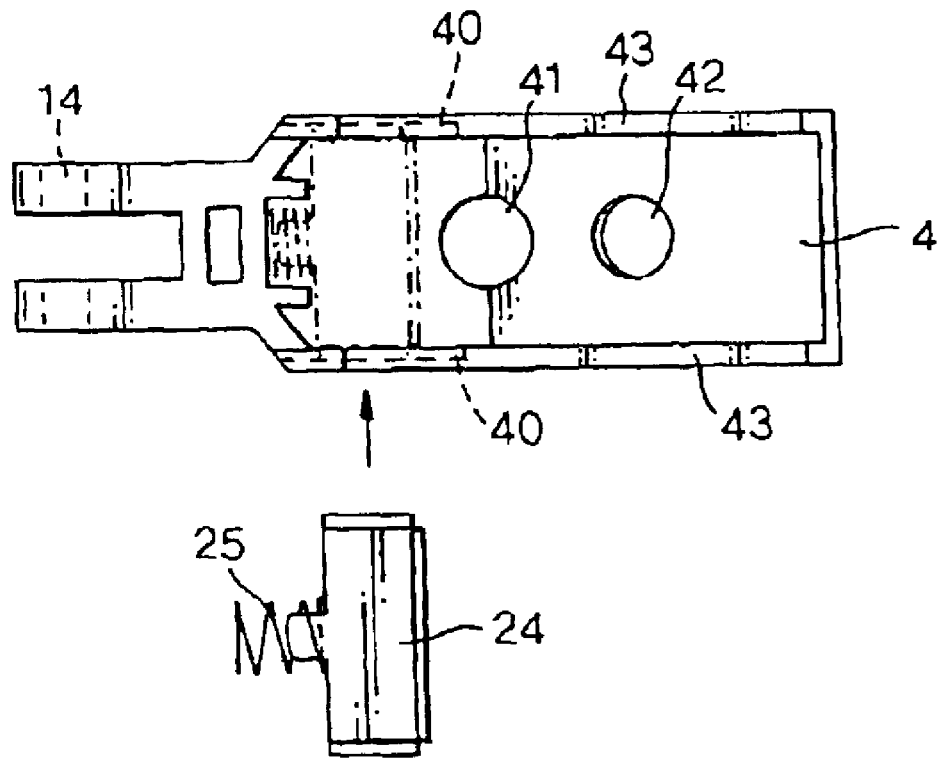
FIG. 6 is a front elevation of the catch body, again showing the position of the slider by dashed lines, together with a removed view.

FIGS. 5 and 6 illustrate the catch body 4 by itself for greater clarity, FIG. 5 shows it in plan, whereas FIG. 6 is a corresponding front elevation. The catch body is provided with grooves 40 in which the slider locates and slides. FIG.

6 also shows a recess 41 for the end of the shaft 21, and a bore 42 through which fixing bolt 11 passes. The catch body is largely hollow, and sidewalls 43 have the effect of shielding that part of the lock mechanism (in particular the slider and detent) which is positioned within the catch body when the catch is locked.

FIGS. 7, 8 and 9 show further details of the construction of the catch handle 3. In these drawings, the handle is shown with the knob removed, revealing recess 27, which contains a semi-circular groove 50. The rear face of the knob is provided with a ridge (not shown), which is received in the groove 50, and is of corresponding height and radius of curvature but extends for only one quarter of a circle in length. The ridge and groove co-operate to limit the maximum rotation of the knob to a quarter of a revolution. FIG. 8 is a section on line A—A, and it may be seen that the handle is also largely hollow; in particular, there is a space 51 which receives the link 5 when the catch is closed.

All the larger components of the catch (in particular the handle and catch body) may be moulded in plastics materials by conventional moulding techniques, whereas the smaller components, especially those which bear significant stresses in use (such as the bolts, pivot pins, detent and slider) are more suitably fabricated in metal, again by conventional techniques.

It will be appreciated that the knob could be replaced by a button, especially one engineered to convert the translatory movement resulting from pressing the button into a rotary movement, e.g. if the button were mounted on a shaft having a spiral thread of suitable pitch. Furthermore, it would be a relatively simple matter to increase the security of the locking mechanism still further by introducing a lifting or pressing action which would be required to unlock the catch, in addition to the rotary action described above. For example, by arranging for the sleeve carrying the detent 22 to slide on the shaft 21, and with suitable adaptation of the semi-circular groove 50 and its co-operating ridge, the knob 20 could be provided with a "pull and twist" action, or indeed a "push and twist" action, which would be more difficult for a would-be thief to reproduce using the usual implements.

It is also possible to provide the button or knob on, or in, the catch body (i.e. the second attachment member) instead of on or in the catch handle. This might, for example, be preferable in a situation where the catch body is larger than the handle, and extends beyond it.

What is claimed is:

1. A catch device for a pivoting window mounted in the bodywork of a vehicle, the device comprising:
    a first attachment member, for fixing to the window,
    an elongate handle, one end of which is pivotally connected to the first attachment member,
    a second attachment member, for fixing to the vehicle bodywork,
    a connecting link connecting the second attachment member to the handle, the length of the link being less than half the length of the handle; one end of the link being rotatable about an axis in the second attachment member, and the other end of the link being rotatable about an axis in the handle, the axes of rotation for the two ends of the link being parallel,
    a locking mechanism to prevent unauthorised opening of the window, wherein the locking mechanism acts between the handle and the second attachment member and passes through a bore extending through the handle and into said second attachment member, and said locking mechanism is unlocked by manual operation of a circular button or knob which is mounted on, or contained within, the
    wherein unlocking of the locking mechanism involves rotating a the button or knob about an axis of rotation which passes through the centre of the button or knob; and
    wherein unlocking of the locking mechanism additionally involves lifting or pressing the button or knob.

2. A catch device as claimed in claim 1, wherein the bore is traversed by a centre-line of the handle which extends in the direction of elongation of the handle.

3. A catch device as claimed in claim 1, wherein the locking mechanism locks automatically on closure of the window.

4. A catch device for a pivoting window mounted in the bodywork of a vehicle, the device comprising:
    a first attachment member, for fixing to the window,
    an elongate handle, one end of which is pivotally connected to the first attachment member,
    a second attachment member, for fixing to the vehicle bodywork,
    a connecting link connecting the second attachment member to the handle, the length of the link being less than half the length of the handle; one end of the link being rotatable about an axis in the second attachment member, and the other end of the link being rotatable about an axis in the handle, the axes of rotation for the two ends of the link being parallel,
    a locking mechanism to prevent unauthorised opening of the window, wherein the locking mechanism acts between the handle and the second attachment member and passes through a bore extending through the handle and into said second attachment member, and said locking mechanism is unlocked by manual operation of a circular button or knob which is mounted on, or contained within, the handle; and
    wherein the connecting link rotates through at least 180°, on opening or closing the window.

5. A catch device as claimed in claim 4, wherein unlocking of the locking mechanism involves rotating the button or knob about an axis of rotation which passes through the centre of the button or knob.

6. A catch device as claimed in claim 4, wherein the button or knob is located in a recess in the handle.

7. A catch device in combination with a window that is adapted to be pivotally mounted to a bodywork of a vehicle comprising:
    a first attachment member fixed to the window,
    an elongate handle having one end articulated to the first attachment member,
    a second attachment member adapted to be fixed to the vehicle bodywork,
    a connecting link connecting the second attachment member to the handle, the length of the link being less than half the length of the handle; one end of the link being rotatable about an axis in the second attachment member, and the other end of the link being rotatable about an axis in the handle, the axes of rotation for the two ends of the link being parallel, and
    a locking mechanism to prevent unauthorised opening of the window, wherein the locking mechanism acts between the handle and the second attachment member and passes through a bore extending through the handle and into said second attachment member, and said locking mechanism is unlocked by manual operation of a circular button or knob which is mounted on, or contained within, the handle.

8. The combination as claimed in claim 7, wherein the bore is traversed by a centre-line of the handle which extends in the direction of elongation of the handle.

9. The combination as claimed in claim 7, wherein the locking mechanism locks automatically on closure of the window.

10. The combination as claimed in claim 7, wherein unlocking of the locking mechanism involves rotating a the button or knob about an axis of rotation which passes through the centre of the button or knob.

11. The combination as claimed in claim 10, wherein unlocking of the locking mechanism additionally involves lifting or pressing the button or knob.

12. The combination as claimed in claim 7, wherein the connecting link rotates through at least 180°, on opening or closing the window.

13. The combination as claimed in claim 7, wherein the button or knob is located in a recess in the handle.

* * * * *

UNITED STATES PATENT AND TRADEMARK OFFICE
CERTIFICATE OF CORRECTION

PATENT NO. : 6,908,124 B2
DATED : June 21, 2005
INVENTOR(S) : Salvatore Colicino It is certified that error appears in the above-identified patent and that said Letters Patent is hereby corrected as shown below:

Column 6,
Line 3, after "the" insert -- handle; --.
Line 5, delete "a".

Column 7,
Line 11, delete "a".

Signed and Sealed this

Twenty-eighth Day of March, 2006

JON W. DUDAS
*Director of the United States Patent and Trademark Office*